US006763604B2

(12) United States Patent
Jordil et al.

(10) Patent No.: US 6,763,604 B2
(45) Date of Patent: Jul. 20, 2004

(54) COLUMN FOR MEASURING LONGITUDINAL DIMENSIONS

(75) Inventors: Pascal Jordil, Ecoteaux (CH); Adriano Zanier, Prilly (CH)

(73) Assignee: Brown & Sharpe TESA SA, Renens (CH)

( * ) Notice: Subject to any disclaimer, the term of this patent is extended or adjusted under 35 U.S.C. 154(b) by 0 days.

(21) Appl. No.: 10/314,615

(22) Filed: Dec. 9, 2002

(65) Prior Publication Data

US 2003/0106233 A1 Jun. 12, 2003

(30) Foreign Application Priority Data

Dec. 12, 2001 (EP) ............................................ 01811217

(51) Int. Cl.$^7$ ................................................ G01B 5/02
(52) U.S. Cl. ......................................................... 33/832
(58) Field of Search .................................. 33/832, 833

(56) References Cited

U.S. PATENT DOCUMENTS

| 4,924,598 | A |   | 5/1990  | Gruhler ......................... 33/832 |
| 5,040,308 | A |   | 8/1991  | Meyer ........................... 33/832 |
| 5,373,645 | A | * | 12/1994 | Bezinge et al. ............... 33/703 |
| 5,937,533 | A | * | 8/1999  | Meyer et al. .................. 33/832 |
| 6,401,352 | B1 | * | 6/2002  | Kimura et al. ................ 33/832 |

FOREIGN PATENT DOCUMENTS

EP             1 089 051 A1      4/2001

* cited by examiner

Primary Examiner—Christopher W. Fulton
(74) Attorney, Agent, or Firm—Pearne & Gordon LLP

(57) ABSTRACT

Column for measuring longitudinal dimensions (1) comprising:

a supporting frame (2),
  a carriage (3) capable of moving along a measuring axis (z) along the supporting frame,
  a probe tip (44) connected to said carriage and designed to be brought into contact with the piece to be measured,
  a driving device of the carriage comprising a cable or belt (40) for moving said carriage along said measuring axis,
  a system for measuring the position of said carriage (3) along said measuring axis,
  a frame connected in an articulated manner to the carriage. The cable or belt are fastened to the frame. The articulation between the frame and the carriage allows at least one pivoting along a pivoting axis (x) parallel to the plane of said carriage.

Advantages: the forces and moments exerted by the cable or belt are not exerted directly onto the carriage. The forces along an axis other than the measuring axis are absorbed by the frame.

18 Claims, 3 Drawing Sheets

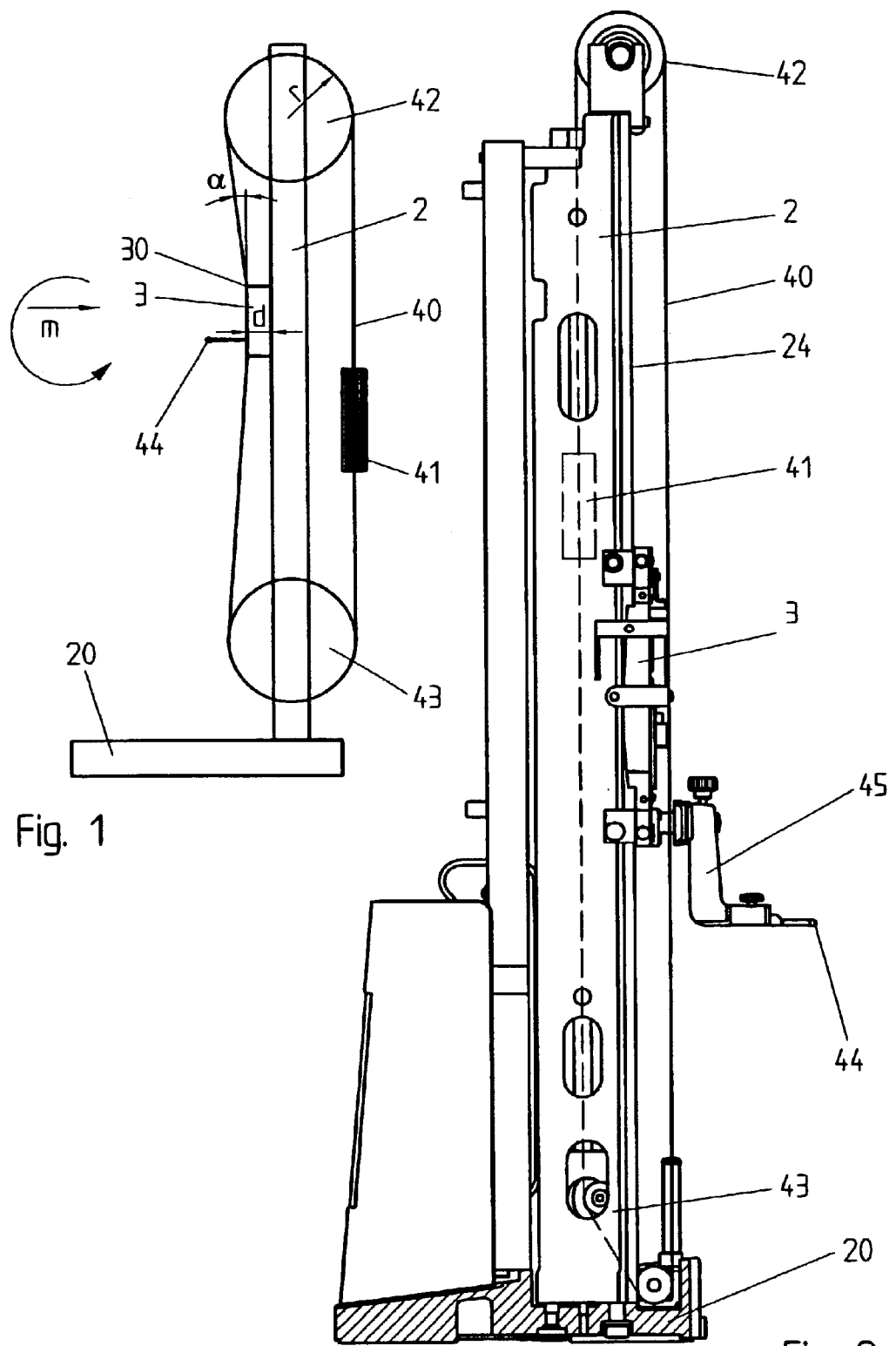

COLUMN FOR MEASURING LONGITUDINAL DIMENSIONS

This application claims priority of European Patent Application EP01811217.7, the content of which is hereby incorporated.

FIELD OF THE INVENTION

The present invention concerns a measuring machine, notably a column for measuring longitudinal dimensions, for example a height-measuring column.

RELATED ART

Height-measuring columns are described for example in document U.S. Pat. No. 4,924,598. They are used for example for measuring or comparing dimensions, for example in mechanical workshops. The measuring column represented diagrammatically in FIG. 1 comprises a fixed supporting frame 2 with a base 20, a carriage 3 that can be displaced vertically along the supporting frame, a device for driving the carriage and a system for measuring the carriage's vertical position. A probe tip 44 is connected to the carriage and is designed for being brought into contact with the piece to be measured. The base can be provided with means for creating an air-cushion in order to easily displace the height-measuring column on the work surface.

The driving device can be hand-operated and actuated by means of a crank, or electrically operated using a motor. The crank or the motor drives a cable or a belt 40 connected to the carriage 3 as well as a counterweight 41 moving in opposite direction from the carriage. The cable or belt is tensed between pulleys 42, 43. The carriage 3 comprises wheels (not represented) for pressing on the guiding rails attached to the supporting frame.

The electronic measuring system allows the position of the carriage, and thus of the probe tip, to be determined and displayed on an electronic display. The resolution and precision that is expected of this type of measuring columns is on the order of the micron.

This precision depends for an important part on the contact force between the probe tip 44 and the piece to be measured. A substantial contact force causes a flexion of the probe tip and/or of the piece, or even an elastic deformation of the material, that can influence the measuring. The contact force between the probe tip and the piece to be measured must thus be minimal or, in any case, identical at each measuring.

Because of the constraints associated with the maximal admissible space requirement and with manufacturing precision, the belt 40 is not always strictly parallel to the supporting frame 2. In particular, it has been observed within the framework of this invention that the fastening angle α of the belt 40 onto the carriage 3 varies according to the carriage's longitudinal position. This is notably the case when the carriage is close to either the lower pulley 43 or upper pulley 42 of the column 1 and when the radius r of the pulleys is different by the distance d between the supporting frame 2 and the fastening point 30 of the belt 40 on the carriage. It is also the case when the position of the center of the pulleys 42, 43 relative to the supporting frame is not controlled precisely. In these circumstances, the traction force of the belt on the carriage is exerted along a non-vertical direction and causes a moment m to be applied along a horizontal axis parallel to the plane of the carriage 3. This moment influences the contact force between the probe tip and the piece, so that the measuring precision varies according to the carriage's longitudinal position.

U.S. Pat. No. 5,040,308 describes a measuring column in which the measuring carriage is connected to the upper end of the driving belt through an adjusting piece. The carriage can slide relative to the adjusting piece in the direction of the measuring axis. However, the articulation between the adjusting piece and the carriage allows only a displacement along the measuring axis. The components of the traction force perpendicular to the measuring axis are thus exerted on the carriage and indirectly on the probe tip.

Patent application EP223736 describes a measuring column in which the measuring carriage is connected to the upper part of the driving belt through a frame. The carriage can pivot and slide horizontally relative to the frame. No means has however been provided to allow the carriage to pivot relative to the frame along a horizontal axis parallel to the plane of the carriage and of the frame. Any moment exerted by the driving cable on the frame will thus invariably be reflected on the probe tip.

Furthermore, the measuring probe tip is placed along an axis y parallel to the plane of the carriage and of the frame. This construction is not very advantageous since the probe tip finds itself far away from the reference surfaces constituted by the guiding rails on the supporting frame. Furthermore, the probe tip is close to an edge of the supporting frame which could risk coming into contact with certain parts of a piece of complex shape.

It is thus an aim of the present invention to propose a height-measuring column in which these problems are solved.

In particular, it is an aim of the present invention to propose a height-measuring column in which the non-vertical components of the force exterted by the driving system on the carriage are reduced.

BRIEF SUMMARY OF THE INVENTION

According to the invention, these aims are achieved by means of a measuring column comprising the characteristics of the independent claim.

In particular, these aims are achieved by means of a column for measuring longitudinal dimensions comprising a supporting frame, a carriage capable of moving along a measuring axis along the supporting frame, a probe tip connected to the carriage and designed to be brought into contact with the piece to be measured, a device for driving the carriage comprising a cable or belt for moving said carriage along said measuring axis, a system for measuring the position of said carriage along said measuring axis, and in which an articulation element between said cable or belt and said carriage allows a pivoting at least along a pivoting axis parallel to the carriage's plane.

This construction has the advantage of applying on the carriage, and thus on the probe tip, only the vertical components of the traction force exerted by the cable or belt. It is thus possible to avoid measuring errors due to a horizontal component of this force, notably when the carriage finds itself close to one of the two pulleys.

DESCRIPTION OF THE DRAWINGS

The invention will be better understood by reading the description of a preferred embodiment given by way of example and illustrated by the attached drawings, in which:

FIG. 1 shows a diagrammatic view of the main components of a height-measuring column.

FIG. 2 shows a side view of a complete height-measuring column.

DETAILED DESCRIPTION OF THE INVENTION

Figure 3:
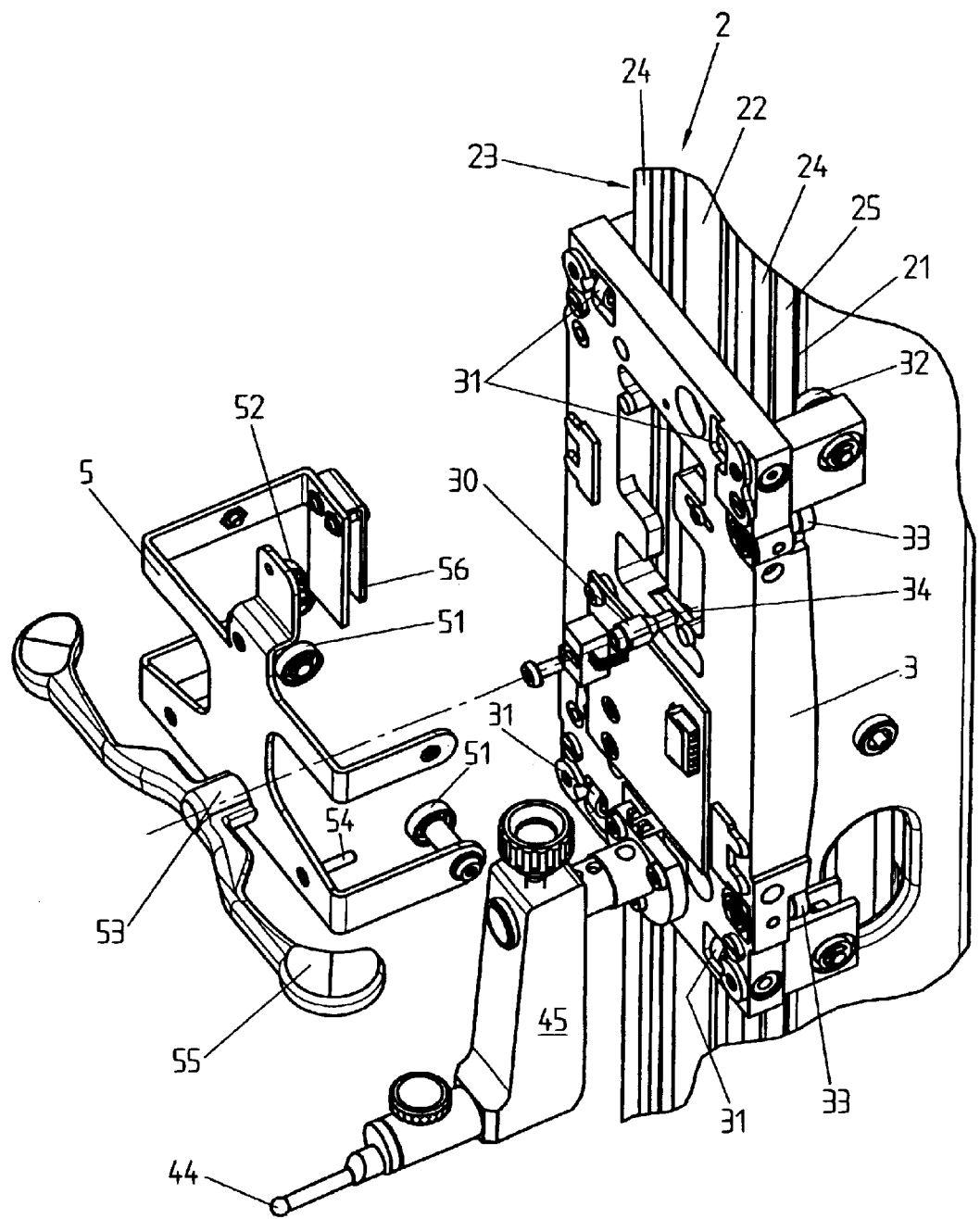
FIG. 3 shows an exploded view of the measuring carriage in a measuring column according to the invention.
Figure 4:
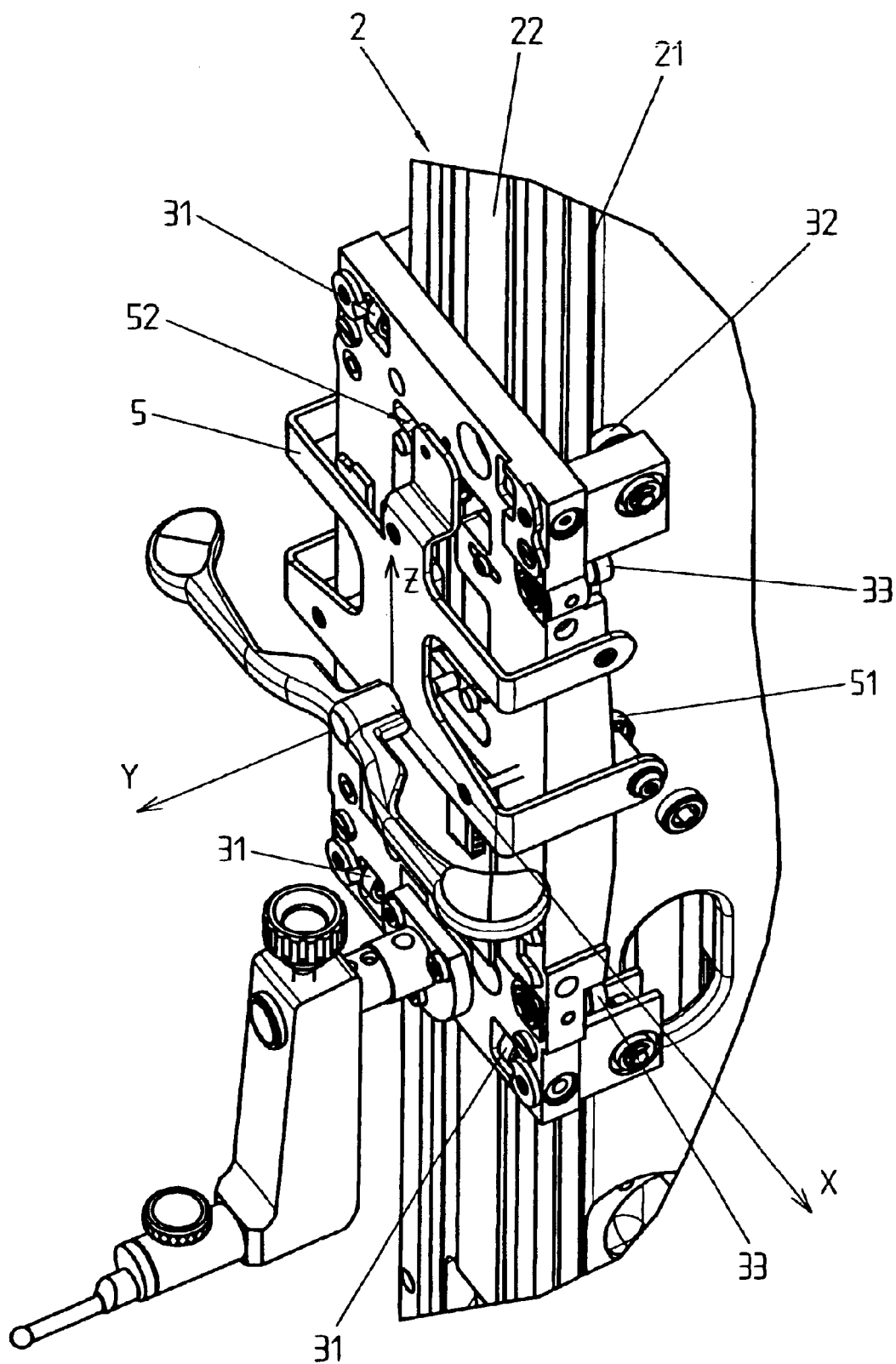
FIG. 4 shows a perspective view of the measuring carriage in a measuring column according to the invention.

An embodiment of the measuring column according to the invention comprises a supporting frame 2 mounted perpendicularly on a base 20. The supporting frame comprises a front side provided with a rule 22, for example capacitive, inductive or magnetic and with guiding rails 24. The rule 22 is for example constituted by a glass rule provided with capacitive or magnetic electrodes. The rule is provided with electrodes that allow a measuring of the absolute or relative position by means of a sensor mounted on the carriage 3. The rails 24 can be added to, or preferably worked on to the supporting frame 2 and constitute a plane supporting surface on which the wheels 31 of the carriage 3 move. Other rails 21 on the rear side of the supporting frame 2 form a rear rolling surface for additional wheels 32. Lateral wheels 33 can further rest on lateral rails 25. The position of the carriage 3 in a horizontal plane x-y is thus entirely defined by the rails 21, 24, 25.

A driving mechanism connected to the supporting frame comprises an upper pulley 42 and a lower pulley 43. The driving mechanism further comprises a motor (not represented) that enables one of the pulleys to be driven in rotation, as well as a cable or belt 40 forming a loop tensed between the two pulleys. The carriage 3 is driven by the cable or belt 40 and can thus be displaced along the vertical axis z by means of the motor. A counterweight 41 fastened on the other part of the loop 40 moves in opposite direction to the carriage 3. The traction force on the belt 40 is controlled precisely for example by means of a friction element (not represented) between the motor and the driving pulley and/or by controlling the motor's driving torque.

A probe tip 44 is mounted on the carriage 3 by means of a tip holder 45. The spherical extremity of the probe tip 44 is designed to be brought into contact with the piece to be measured. A measuring system of the capacitive, inductive, opto-electronic or magneto-resistive type allows the position of the probe tip 44 or the displacement effected by the probe tip 44 between two measure points to be displayed on an electronic display (not represented). The measuring system comprises for example an electronic sensor mounted on the carriage 3 opposite the rule 22 and connected by a flexible cable mat (not represented), possibly by a local radio connection, to a measuring control and display console.

According to the invention, the cable or belt 40 is connected to the carriage 3 by means of an articulation element constituted in this example by a frame 5 and a pivot 30. The frame serves as force-spreading element and comprises a front wheel 52 for resting on the front rail 22 of the supporting frame 2 and rear wheels 51 for resting on the rear rails 21 of the supporting frame. Two spacing columns 54 serve as stops enabling the frame 5 to be kept at a distance from the carriage 3 by exerting if necessary a minimal pressure close to the carriage's center of gravity. The frame 5 is connected to the carriage 3 through the pivot 30 inserted loosely in an opening 34 in the carriage. The opening 34 is close to the geometrical center of the carriage's stays. The forces transmitted by the frame 5 to the carriage 3 are thus all exerted on this point. In particular, the carriage is driven along a vertical measuring axis z only by this driving point 34.

The lower and upper ends of the cable or belt 40 are fastened to the frame 5 by a wing nut or screw 55 mounted at a point 53 in the frame's median axis. The frame is screwed on the pivot 30. The wing nut or screw 55 makes it possible to move the carriage by hand by driving it at a point close to the geometrical center of the carriage's stays.

The play between the opening 34 and the pivot 30 is sufficient to enable a rotation of the pivot and of the frame along the axis y. Furthermore, the frame 5 is mounted sufficiently loosely on the pivot 30 to pivot easily along an horizontal axis x parallel to the frame and passing by the pivot head. The pivot can furthermore slide in the opening 34 along its longitudinal axis y.

In this manner, when the angle $\alpha$ between the cable or belt 40 and the supporting frame 2 increases, the frame 5 can pivot around the axis x. The upper part of the frame 5 can thus move, the wheel 52 being even capable of being separated from the rail 22. The lower part of the frame 5 can move towards or away from the carriage 3 thanks to the play between the pivot 30 and the opening 34. However, the spacing columns 54 prevent displacements of too great an amplitude and make it possible to avoid for example that the frame oscillates when the carriage is moved rapidly along the measuring axis z.

It will thus be understood that the forces and moments exerted by the traction of the cable or belt 40 are not exerted directly on the carriage 3 but first and foremost on the frame 5. The components of the forces parallel to the axis y as well as the moments along the axis x are transmitted through the wheels 51, 52 to the supporting frame 2 that absorbs them. This is in particular the case of the moments m along the horizontal axis x, that can be caused notably by an angle $\alpha$ between the belt 40 and the supporting frame 2. The moments along the axis y, caused for example by a cable that is not perfectly in the median axis of the supporting frame, cause a pivoting of the frame 5 that is not reflected on the carriage 3.

Apart from the traction cable or belt 40, the cable mat (not represented) connecting the measuring sensor to the display device can also exert a traction or a moment on the carriage 3. This is particular the case when this mat is tensed at the end of the ride or when the weight of the cables in suspension is supported by the carriage. According to the invention, the cable mat is also connected to the frame 5 so that these undesirable forces and moments are exerted also on the frame rather than directly onto the carriage. In the embodiment illustrated, the cables are connected to the frame by a clamp 56 that hold them elastically at the back of the frame 5. The arrangement of the clamp at the back of the supporting frame 2 also allows the risk of the cable mat coming into contact with the piece to be measured or with the probe tip to be reduced.

In the illustrated embodiment, the articulation element between the cable or belt 40 and the carriage is constituted by a frame 5 framing the carriage 3. This embodiment has the advantage that the total length of the carriage-frame coupling is reduced and thus that the maximal measuring course along the supporting frame of a given height is increased. It is further possible thanks to this advantageous arrangement to fasten the upper end and the lower end of the driving cable or belt 40 at a same point. In a less advantageous embodiment, it would however also be possible to use an articulation element arranged differently relative to the carriage 3, for example one or several articulation elements mounted above and/or under the carriage and in its extension.

In the illustrated embodiment, the connection between the frame 5 and the carriage 3 is effected by means of a pivot enabling a translation along the horizontal axis y and rotations along the horizontal axes x and y. Other articulated connecting means allowing different degrees of freedom can however also be easily conceived within the framework of this invention.

What is claimed is:

1. Column for measuring longitudinal dimensions comprising:
   a supporting frame,
   a carriage capable of moving along a measuring axis along the supporting frame,
   a probe tip connected to said carriage and designed to be brought into contact with the piece to be measured,
   a driving device of the carriage comprising a cable or belt for moving said carriage along said measuring axis,
   a system for measuring the position of said carriage along said measuring axis,
   an articulation element between said cable or belt and said carriage allowing at least one pivoting along a pivoting axis parallel to the plane of said carriage.

2. The measuring column of claim 1, wherein said pivoting axis is horizontal.

3. The measuring column of claim 2, wherein said articulation element also allows a pivoting along an axis perpendicular to said plane of the carriage.

4. The measuring column of claim 1, wherein said articulation element comprises a force-spreading element fastened to said cable or belt and a connecting element between said force-spreading element and said carriage.

5. The measuring column of claim 4, wherein said force-spreading element comprises at least one wheel for resting on said supporting frame.

6. The measuring column of claim 5, wherein said force-spreading element comprises at least one wheel for resting on a front side of said supporting frame and at least one wheel for resting on a rear side of said supporting frame.

7. The measuring column of claim 6, said force-spreading element being free to pivot along any horizontal axis.

8. The measuring column of claim 4, wherein said force-spreading element is shaped as a frame partially covering said carriage.

9. The measuring column of claim 8, comprising at least one stop for limiting the magnitude of the relative displacements between said frame and said carriage.

10. The measuring column of claim 4, wherein said connecting element is constituted by a horizontal pivot.

11. The measuring column of claim 10, said pivot being mounted so as to allow a relative displacement of said force-spreading element and of said carriage along the longitudinal axis of said pivot.

12. The measuring column of claim 1, wherein said carriage is driven by said articulation element at a single point close to the geometrical center of the stays of said carriage.

13. The measuring column of claim 1, wherein the upper end and the lower end of said cable or belt are both fastened at a same point to said articulation element.

14. The measuring column of claim 13, wherein the upper end and the lower end of said cable or belt are both fastened to said articulation element at a point close to the driving point of said carriage.

15. The measuring column of claim 1, wherein said probe tip is mounted perpendicularly to the plane of said carriage.

16. The measuring column of claim 1, comprising at least one cable connected to said measuring system on said carriage, said at least one cable being connected to said articulation element so as to prevent said cable or belt from exerting a force or a moment directly onto said carriage.

17. Column for measuring longitudinal dimensions comprising:
    a supporting frame,
    a carriage capable of moving along a measuring axis along the supporting frame,
    a probe tip connected to said carriage and designed to be brought into contact with the piece to be measured,
    a driving device of the carriage comprising a cable or belt for moving said carriage along said measuring axis,
    a measuring system for measuring the position of said carriage along said measuring axis,
    an articulation element between said cable or belt and said carriage allowing at least one pivoting along a pivoting axis parallel to the plane of said measuring system.

18. Column for measuring longitudinal dimensions comprising:
    a supporting frame,
    a carriage capable of moving along a measuring axis along the supporting frame,
    a probe tip connected to said carriage and designed to be brought into contact with the piece to be measured,
    a driving device of the carriage comprising a cable or belt for moving said carriage along said measuring axis, said cable or belt running essentially parallel to said supporting frame,
    a measuring system for measuring the position of said carriage along said measuring axis,
    an articulation element between said cable or belt and said carriage allowing at least one pivoting along a pivoting axis perpendicular to a distance between said cable or belt and said supporting frame.

* * * * *